(12) United States Patent
Meziere

(10) Patent No.: US 11,454,136 B2
(45) Date of Patent: Sep. 27, 2022

(54) METHOD FOR PRODUCING A SHIELDING CARTRIDGE FOR A TURBOMACHINE ELEMENT AND CORRESPONDING SHIELDING CARTRIDGE AND TURBOMACHINE ELEMENT

(71) Applicant: SAFRAN HELICOPTER ENGINES

(72) Inventor: Ludovic Meziere, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/468,254

(22) PCT Filed: Dec. 11, 2017

(86) PCT No.: PCT/FR2017/053492
§ 371 (c)(1),
(2) Date: Jun. 10, 2019

(87) PCT Pub. No.: WO2018/109343
PCT Pub. Date: Jun. 21, 2018

(65) Prior Publication Data
US 2020/0095894 A1 Mar. 26, 2020

(30) Foreign Application Priority Data
Dec. 14, 2016 (FR) ...................................... 1662465

(51) Int. Cl.
*F01D 25/24* (2006.01)
*F01D 21/04* (2006.01)
(Continued)

(52) U.S. Cl.
CPC ......... *F01D 25/246* (2013.01); *F01D 21/045* (2013.01); *B29C 70/32* (2013.01);
(Continued)

(58) Field of Classification Search
CPC ...... F01D 25/24; F01D 25/246; F01D 21/045; F01D 9/041; F01D 11/08; F01D 11/12;
(Continued)

(56) References Cited

U.S. PATENT DOCUMENTS 4,377,370 A * 3/1983 Porcelli ................. F01D 21/045
415/9
4,648,795 A * 3/1987 Lardellier ............. F01D 21/045
415/173.4
(Continued)

FOREIGN PATENT DOCUMENTS

GB 2 159 886 A 12/1985
WO 2011/040915 A1 4/2011

OTHER PUBLICATIONS

Written Opinion of the International Searching Authority dated Mar. 19, 2018, issued in corresponding International Application No. PCT/FR2017/053492, filed Dec. 11, 2017, 6 pages.
(Continued)

*Primary Examiner* — Ninh H. Nguyen
*Assistant Examiner* — Eric J Zamora Alvarez
(74) *Attorney, Agent, or Firm* — Christensen O'Connor Johnson Kindness PLLC

(57) ABSTRACT

The invention relates to a method for producing a shielding cartridge (1) of a turbomachine element (10), said method comprising a step of winding a carbon wire (3) comprising a plurality of fibres about a longitudinal axis and a step of trapping and preserving the outside surroundings of the wound-up wire (3) in a housing (2).

11 Claims, 2 Drawing Sheets

(51) Int. Cl.
  *F01D 9/04* (2006.01)
  *B29C 70/32* (2006.01)

(52) U.S. Cl.
  CPC ............ *F01D 9/041* (2013.01); *F01D 25/243* (2013.01); *F05D 2220/36* (2013.01); *F05D 2300/603* (2013.01)

(58) Field of Classification Search
  CPC .... F01D 11/125; F01D 11/127; F01D 25/243; F01D 25/005; F05D 2220/36; F05D 2240/14; F05D 2300/614; F05D 2300/702; F05D 2300/433; F05D 2300/603; F04D 29/526; F04D 29/522; Y10T 428/2936; Y10T 428/30; Y10T 428/1314; B29C 70/32
  See application file for complete search history.

(56) References Cited

U.S. PATENT DOCUMENTS

| | | | | |
|---|---|---|---|---|
| 4,699,567 A * | 10/1987 | Stewart | ................ | F01D 21/045 415/200 |
| 7,338,250 B2 * | 3/2008 | Martindale | ........... | F01D 21/045 415/9 |
| 7,713,021 B2 * | 5/2010 | Finn | ..................... | F04D 29/526 415/9 |
| 7,766,603 B2 * | 8/2010 | Beckford | ................ | F01D 25/24 415/9 |
| 8,087,873 B2 * | 1/2012 | Cacace | ................. | F01D 21/045 415/9 |
| 8,425,178 B2 * | 4/2013 | Lenk | .................... | F01D 21/045 415/9 |
| 9,169,045 B2 * | 10/2015 | Clark | .................... | B65D 51/14 |
| 9,429,038 B2 * | 8/2016 | Sahores | .................. | B21K 1/26 |
| 2015/0274911 A1 * | 10/2015 | Suzuki | ..................... | B32B 5/26 428/414 |

OTHER PUBLICATIONS

International Preliminary Report on Patentability dated Jun. 18, 2019, issued in corresponding International Application No. PCT/FR2017/053492, filed Dec. 11, 2017, 1 page.

International Search Report dated Mar. 19, 2018, issued in corresponding International Application No. PCT/FR2017/053492, filed Dec. 11, 2017, 4 pages.

* cited by examiner

METHOD FOR PRODUCING A SHIELDING CARTRIDGE FOR A TURBOMACHINE ELEMENT AND CORRESPONDING SHIELDING CARTRIDGE AND TURBOMACHINE ELEMENT

1. FIELD OF THE INVENTION

This invention concerns the field of the protection of turbomachines, in particular, but not exclusively, aeronautical turbomachines. It concerns, in particular, a method for producing a shielding cartridge for a turbomachine element requiring protection against the high-energy release of parts or components or pieces and debris of said elements in rotation of the turbomachine that are likely to detach. It also concerns a shielding cartridge and a turbomachine element equipped with such a shielding cartridge.

2. BACKGROUND ART

Aeronautical turbomachines are equipped with many rotating members that rotate at high rotation speeds. These rotating members can be blade members such as compressors or turbines that include blades attached to a disc. These blades, whether or not they are attached to the disc by mechanical or metallurgical assembly, are subject to failure or even rupture during the rotation of these members. The rupture or failure of these rotating members rotating at high rotation speeds would generate debris and fragments ejected at high-energy capable of passing through, for example, turbomachine casings, causing considerable damage in and outside the turbomachine. The rupture of certain fragments can also occur voluntarily and decided during the design phase. Indeed, it is possible to arrange fusible zones, for example, on blades in such a way as to create a voluntary and controlled rupture of the latter in the event of overspeed of the turbomachine to protect against a bursting of the disc. Rotating blade members generally include several dozen blades capable of releasing considerable energy that is difficult to absorb and contain if they were to break.

Aeronautical regulations require that any high energy potential debris or fragments is contained and confined within the turbomachine to avoid damage outside the turbomachine.

It is thus known to install protection systems on elements of the turbomachine to contain and confine possible debris and fragments. An example of a protection system includes a thick shield attached to a casing extending around the rotating member. This shielding is generally made of titanium or steel for relatively cold compressors and nickel-based alloy for turbines in surroundings with temperatures above 500° C. An example of shielding is known from patent document FR-A1-2964145. However, this shielding has a passive mass that penalizes the performance of the turbomachine. Indeed, the mass of this shielding can represent up to 7% of the mass of the turbomachine. It is a mass provided preventively that does not contribute to the performance of the turbomachine other than by ensuring a safety requirement. Other Kevlar® shields, which are generally used perpendicularly of turbomachine fans or first compressor stages, remain limited to temperatures below 500° C. and have a high cost. These shields are therefore sensitive to the surrounding temperature. These shields are also subject to corrosion and oxidation, which reduce the intrinsic retention capacity of the material by weakening it. It is also known from document WO-A1-2011/040915 a protection system. However, its producing method is still long and expensive and the materials used, particularly for the housing containing laminates, do not allow it to resist high temperatures.

3. OBJECTIVE OF THE INVENTION

One of the objectives of this invention is to provide a shielding cartridge to protect elements of the turbomachine from debris and fragments and to absorb their energy while avoiding penalizing the mass of the turbomachine.

4. DISCLOSURE OF THE INVENTION

This objective is achieved, in accordance with the invention, by a method for producing a shielding cartridge of a turbomachine element, the method including a step of winding a carbon wire about a longitudinal axis, the carbon wire including a plurality of fibers, and a step of trapping and preserving from the outside surroundings of the wound-up wire in a housing wherein the housing is closed by a cover, the housing and the cover being made of a metallic material or a metallic alloy.

Thus, this solution makes it possible to achieve the above-mentioned objective. This simple and inexpensive method makes it possible to provide a particularly light shielding cartridge that can resist high temperatures such as 500° C. and to guarantee the durability and resistance of the mechanical properties of the shielding cartridge. The closing of the housing by a cover also ensures the tightness of the housing and that the carbon wire is not exposed to the outside surroundings.

In this invention, the term "trapping and preserving" refers to holding and containing the carbon wire wound-up inside the sealed housing and preserving the carbon wire from the outside surroundings to prevent its oxidation or corrosion.

Advantageously, but not limited to, the step of closing the housing by the cover is carried out by welding under vacuum or in a neutral non-oxidizing atmosphere in order to permanently isolate the carbon wire from the outside surroundings and from oxidation.

The invention also concerns a shielding cartridge of a turbomachine element, including a housing, a carbon wire wound-up around a longitudinal axis, trapped and preserved from the outside surroundings in said housing and a cover fixed to the housing, the carbon wire including a plurality of fibers, and the housing and the cover being made of a metallic material or a metallic alloy. The configuration of this cartridge makes it possible to efficiently and permanently, on one hand to resist shear and deformation and, in the other hand to resist high temperatures. Such a simple design cartridge also allows a mass gain of at least 3 to 4 times the mass of the shields of a prior art turbomachine. In addition, this shielding cartridge is inexpensive to manufacture without any interface or carbon-metal connection to provide at the ends of the wound-up wire. Finally, the material of the housing and cover allows to obtain a lightweight cartridge with a capacity to relocate shocks by a good puncture resistance and shear strength, as well as good resistance to high temperatures, i.e. at least 500° C.

According to a characteristic of the invention, the wire is wound-up in such a way as to form a plurality of spirals of fibers wound up and tightened to each other in order to increase the mechanical performance of the cartridge.

According to another characteristic of the invention, the fibers include a polymeric material or a composite material.

According to yet another characteristic of the invention, the fibers include a polyacrylonitrile. The fibers made of polyacrylonitrile have a high tensile strength and elastic modulus depending on the treatment used to obtain these fibers.

According to another characteristic of the invention, the wound-up wire includes in its longitudinal section between 15,000 and 25,000 fibers per $mm^2$.

Advantageously, but not limited to, the wire includes two free ends in the housing. Such a configuration prevents a mechanical connection between the wound-up wire and the housing that could cause delamination of the fibers of the wire.

The invention also concerns a turbomachine element equipped with a shielding cartridge having any of the above-mentioned characteristics.

In particular, a turbomachine element could include a casing.

The invention also concerns a turbomachine including at least one of the above-mentioned elements.

5. BRIEF DESCRIPTION OF THE DRAWINGS

The invention will be better understood, and other purposes, details, characteristics and advantages of the invention will appear more clearly when reading the detailed explanatory description that follows, of the embodiments of the invention given as purely illustrative and not restrictive examples, with reference to the attached schematic drawings.

On these drawings:

FIG. 1 schematically illustrates an example of a shielding cartridge of a turbomachine element in axial section in accordance with the invention;

FIG. 2 schematically illustrates a turbomachine element equipped with a shielding cartridge according to the invention;

6. DESCRIPTION OF EMBODIMENTS OF THE INVENTION

Figure 1:
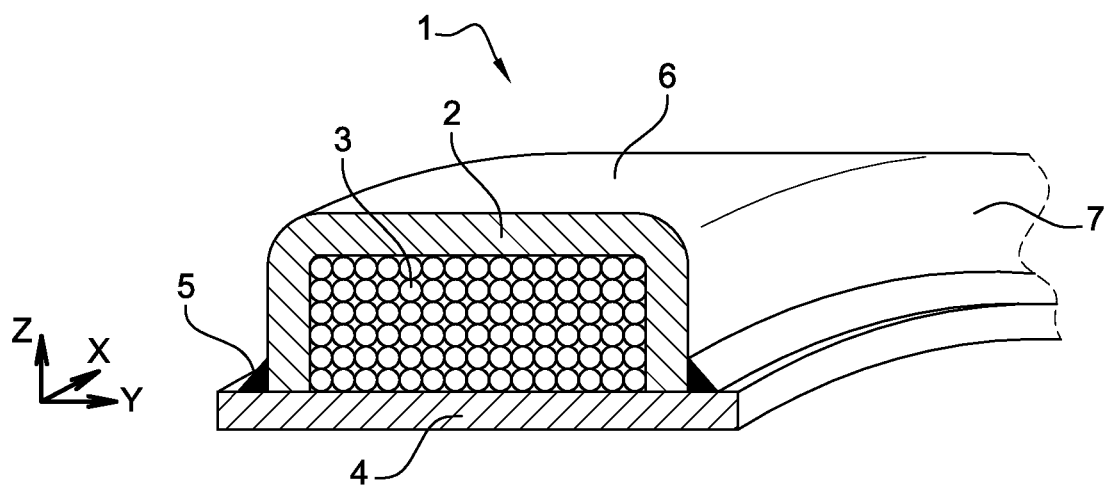

A shielding cartridge 1 according to the invention is partially represented in axial section on FIG. 1. This shielding cartridge 1 is adapted to equip a turbomachine element such as a casing arranged facing a rotating blade member. Such a rotating blade member can be a compressor, turbine or fan rotor.

The shielding cartridge 1 includes a housing 2 or an elongated gutter along a longitudinal axis X. FIG. 1 also shows an axis Y transverse perpendicular to the axis X and an axis Z, here vertical perpendicular to the axes X and Y. These axes X, Y, Z define an orthonormal mark. In the housing 2 is trapped and preserved from the outside surroundings a wound-up wire 3. The wound-up wire 3 is trapped in this example by means of a cover 4 attached to the housing 2. The cover 4 thus makes it possible to close the housing 2 in a sealed way and to preserve the carbon wire 3 from the outside surroundings. As illustrated, the housing 2 has a substantially U-shaped section with a base 6 extending along the longitudinal axis X and two side walls 7 extending from this base 3 along the vertical axis Z.

The housing 2 is made of a metallic material or a metallic alloy. The metallic material can be titanium or steel, which can on one hand, provide good resistance to high temperatures and, on the other hand, resist to perforation and shearing. Titanium and steel are also lightweight materials. Alternatively, the material is a nickel-based metal alloy. An example of a metal alloy is Inconel 625, which also has good high temperature resistance properties. Advantageously, but not limited to, the housing 2 has a wall thickness of between 0.5 and 1.5 mm.

Figure 3:
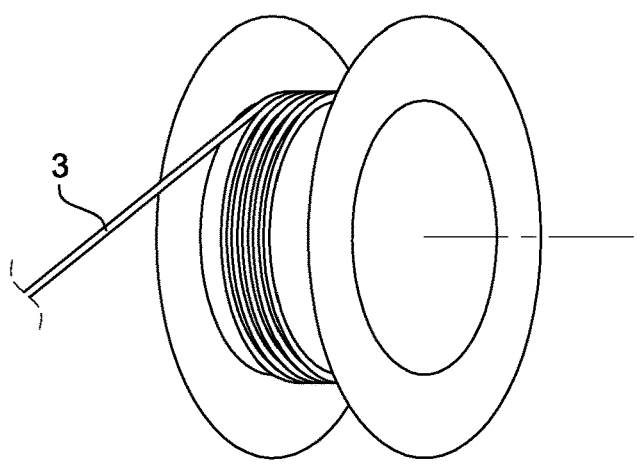
FIG. 3 shows a schematic representation of a wound-up wire.

The wire 3 wound-up in the housing 2 is made from a plurality of fibers allowing the shielding cartridge to resist deformations to absorb the energy of ejected fragments. The number of fibers composing this wire is included between 1,000 and 40,000. Each fiber has a diameter of between 4 and 8 μm. The wound-up wire 3 forms spirals of fibers with a high fiber density. The spirals of fibers are thus tightened to each other. The wire 3 is wound-up as a coil as shown schematically in FIG. 3 to optimize the number of spirals in a minimum volume. The wire 3 is wound-up along a longitudinal axis. The fibers are made of a polymeric or composite material. In this example the fibers include a polyacrylonitrile (PAN). The PAN fibers undergo several treatments to form the carbon wire. The PAN fibers have a high mechanical tensile strength of between 3,000 and 6,000 MPa. They also have a high elastic modulus of between 200 and 600 Gpa depending on the treatment used to obtain these fibers.

Each spiral of the wire 3 includes, for a surface area of 1 $mm^2$ between 15,000 and 25,000 fibers. In other words, the wound-up wire 3 includes in longitudinal section between 15,000 and 25,000 fibers per $mm^2$.

Thus, wound-up fibers can absorb about ten times more energy with a mass about four times lower than the shielding of the prior art.

Alternatively, the fibers are made from any other equivalent carbonaceous member grouped together in the form of wire.

The wire 3 includes two opposite ends that are free in the housing 2. In particular, the ends of the wire are arranged so that they are not fixed to housing 2 to avoid any delaminating effect of the fibers on potential interfaces. The mechanical assembly of the carbon wire 3 and housing 2 is carried out by the large number of spirals of the wire.

In addition, no resin-based matrix is used to avoid any glass transition effect or the thermomechanical capacity of a matrix over time.

The cover 4 makes it possible to seal the housing 2 when it is closed. The cover 4 is defined in a plane substantially parallel to the longitudinal axis X. The cover 4 is also made of a metallic material or a metallic alloy. Such a metallic material is steel or titanium to resist high temperatures. The latter are at least 500° C. A metallic alloy is a nickel-based titanium. The cover 4 is attached to the housing 2 to hold the wire wound-up in the housing 2. The fixing is carried out by means of a weld 5 performed preferably but not limited to, in a vacuum to isolate the fibers from the outside surroundings and in particular from oxidation. The cover 4 has a thickness of between 0.5 and 1.5 mm.

Figure 2:
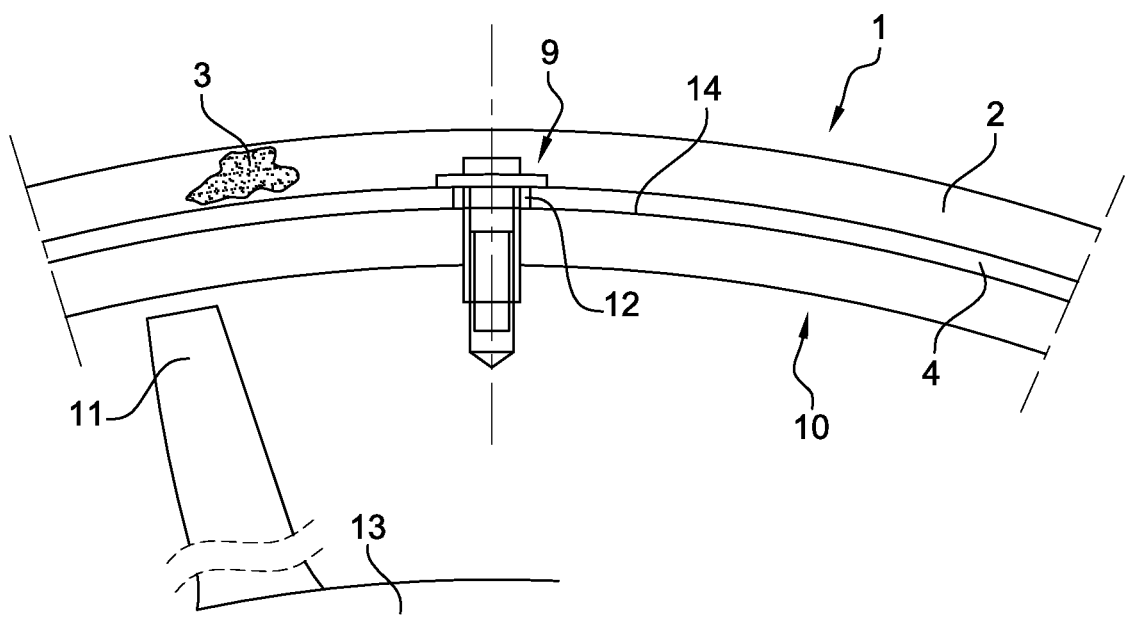

FIG. 2 shows a partial illustration of a turbomachine element 10 in a cross-section. This element 10 is a turbomachine casing enclosing one or more compressor(s) and/or turbine(s) rotors. The compressor or turbine includes blades 11 on the periphery of a disc 13 driven in rotation along an axis O by a shaft of the turbomachine. The casing is equipped with a shielding cartridge 1 to ensure the retention of fragments of the blade and/or of the disc driven in rotation. The shielding cartridge 1 is fixed to the casing via fixing means 9 such as screws, bolts or other similar members. The fixing means 9 cooperate with the cover 4 for fixing the cartridge. In this example, the cover 4 includes lateral portions 14 of its wall extending on either side of the housing 2 with respect to the axis X. In other words, these cover portions overhang the side walls 7 of the housing 2. They extend along the axis X. These cover portions include openings 12 through which the fixing means 9 for fixing the cartridge 1 to the casing are inserted. These fixing means 9 only pass through these cover portions.

Figure 4A:
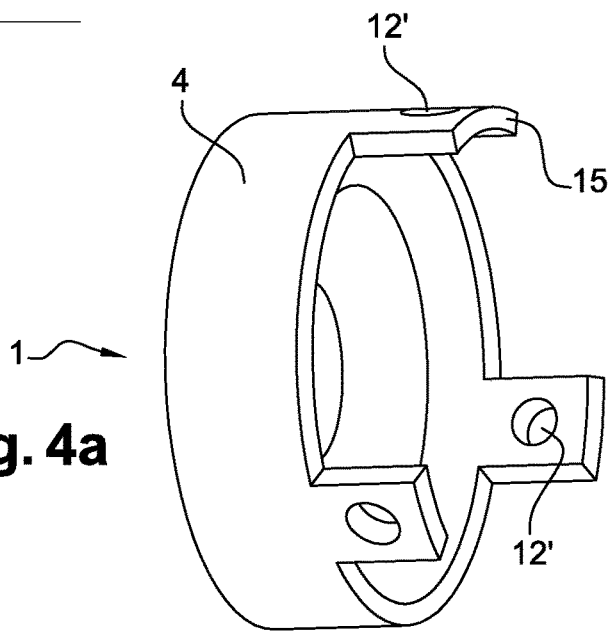
FIGS. 4a and 4b are perspective views of a cartridge and in axial section of the cartridge mounted on a turbomachine element following another embodiment; and, FIG. 5 shows a flowchart according to the methods of the invention.
Figure 4B:
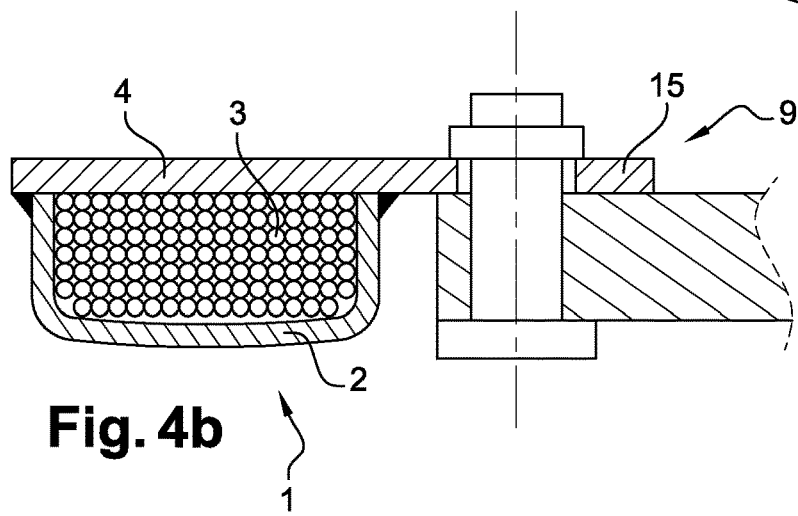

Alternatively, as shown in FIGS. 4*a* and 4*b*, the shielding cartridge 1 is fixed to the casing via the fixing means 9 also cooperating with the cover 4. The latter includes lateral extensions 15 of its wall along the axis Y. These lateral extensions 15 extend only to one side of the cover 4 and the housing. These are evenly distributed on the periphery of one edge of the cover 4. The cover 4 in this example contains three lateral extensions 15. Each side extension 15 includes an opening 12' to receive the fixing means 9. As in the previous example, the fixing means 9 include screws, bolts or other similar members. The lateral extensions 15 are fixed to the turbomachine casing via these fixing means 9. Once the lateral extensions are fixed, the housing 2 containing the wound-up wire 3 is arranged at a distance from the casing as the extensions protrude from a lateral wall of the housing.

Figure 5:
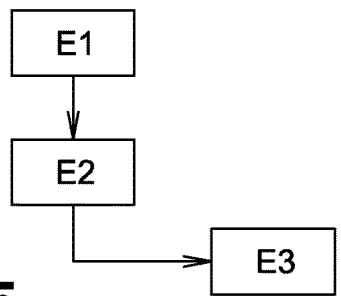

This shielding cartridge 1 is manufactured by a simple and inexpensive producing method. With reference to FIG. 5, the method includes a step E1 of winding of the carbon wire 3 including a plurality of fibers around a longitudinal axis and a step E2 of trapping and preserving the outside surroundings of the wire 3 wound-up in a housing 2. Before this step, one end of the wire is held temporarily attached in order to wind the wire more easily. The end of the wire can be temporarily attached, for example, with an adhesive.

The step E2 of trapping and preserving includes a step E3 of closing the housing 3 with a cover 4 to ensure the tightness of the housing. Before closing the housing 2 with the cover 4, the end of the wire is held attached in the housing 2 is released. The closing step E3 is in this example performed by vacuum welding to avoid oxidation of the carbon wire 3.

The invention claimed is:

1. A method for producing a shielding cartridge of a turbomachine element, the method including:
   winding a carbon wire about a longitudinal axis, the wound carbon wire including a plurality of fibers, and
   trapping and preserving the wound carbon wire in a housing, wherein the housing is closed by a cover, the housing and the cover comprising a metallic material or a metallic alloy,
   wherein the wound carbon wire is arranged in a plurality of rows in the housing, each row extending along a direction perpendicular to the longitudinal axis.

2. The method for producing according to claim 1, wherein closing the housing by the cover is carried out by welding in a vacuum or in a neutral non-oxidizing atmosphere.

3. A shielding cartridge of a turbomachine element, including
   a housing,
   a carbon wire wound about a longitudinal axis, wherein the wound carbon wire is trapped and preserved from outside surroundings in said housing, wherein the wound carbon wire includes a plurality of fibers, and
   a cover fixed to the housing, wherein the housing and the cover comprise a metallic material or a metallic alloy,
   wherein the wound carbon wire is arranged in a plurality of rows in the housing, each row extending along a direction perpendicular to the longitudinal axis, and
   wherein the wound carbon wire is not fixed to the housing.

4. The shielding cartridge according to claim 3, wherein the plurality of fibers include a polymeric material or a composite material.

5. The shielding cartridge according to claim 3, wherein the plurality of fibers are made of polyacrylonitrile.

6. The shielding cartridge according to claim 3, wherein a longitudinal section of the wound carbon wire is between 15,000 and 25,000 fibers per mm$^2$.

7. The shielding cartridge according to claim 3, wherein the wound carbon wire includes two free ends in the housing.

8. A turbomachine element, including the shielding cartridge according to claim 3.

9. The shielding cartridge according to claim 3, wherein the wound carbon wire is a single wire.

10. A shielding cartridge of a turbomachine element, comprising:
    a housing,
    a carbon wire wound about a longitudinal axis, wherein the wound carbon wire is trapped and preserved from outside surroundings in said housing, wherein the wound carbon wire includes a plurality of fibers, and
    a cover fixed to the housing, wherein the housing and the cover comprise a metallic material or a metallic alloy,
    wherein the wound carbon wire is arranged in a plurality of rows in the housing, each row extending along a direction perpendicular to the longitudinal axis,
    wherein a longitudinal section of the wound carbon wire is between 15,000 and 25,000 fibers per mm$^2$ to increase absorption of energy.

11. A shielding cartridge of a turbomachine element, comprising:
    a housing,
    a carbon wire wound about a longitudinal axis, wherein the wound carbon wire is trapped and preserved from outside surroundings in said housing, wherein the wound carbon wire includes a plurality of fibers, and
    a cover fixed to the housing, wherein the housing and the cover comprise a metallic material or a metallic alloy,
    wherein the wound carbon wire is free of resin around rows of said wound carbon wire, each row of said wound carbon wire extending along a direction perpendicular to the longitudinal axis, and
    and wherein the wound carbon wire is not fixed to the housing.

\* \* \* \* \*